United States Patent [19]

Dudash et al.

[11] Patent Number: 4,502,336
[45] Date of Patent: Mar. 5, 1985

[54] PRESSURE MEASURING DEVICE

[75] Inventors: Carl S. Dudash, Enfield; Brian G. Donnelly, West Suffield, both of Conn.

[73] Assignee: United Technologies Corporation, Hartford, Conn.

[21] Appl. No.: 417,932

[22] Filed: Sep. 14, 1982

[51] Int. Cl.³ .............................................. G01L 7/04
[52] U.S. Cl. ........................................ 73/736; 73/756
[58] Field of Search .................................. 73/756, 736

[56] References Cited

U.S. PATENT DOCUMENTS

| Re. 27,728 | 8/1973 | Kosker et al. | 340/190 |
|---|---|---|---|
| 1,914,082 | 6/1933 | Dennis . | |
| 2,358,571 | 9/1944 | Hall | 177/311.5 |
| 3,067,617 | 12/1962 | Buck | 73/411 |
| 3,118,069 | 1/1964 | Guillant | 250/231 |
| 3,248,727 | 4/1966 | Anastasia | 340/347 |
| 3,463,010 | 8/1969 | Hatschek | 73/756 |
| 3,535,538 | 10/1970 | Filloux | 250/230 |
| 3,591,841 | 7/1971 | Heitmann et al. | 250/231 R |
| 3,729,047 | 4/1973 | Bohnlein et al. | 164/150 |
| 3,780,589 | 12/1973 | Fruit | 73/418 |
| 3,788,144 | 1/1974 | Armand | 73/411 |
| 3,789,667 | 2/1974 | Porter et al. | 73/406 |
| 4,110,610 | 8/1978 | Mueller et al. | 250/231 SE |

Primary Examiner—Donald O. Woodiel
Attorney, Agent, or Firm—John Swiatocha

[57] ABSTRACT

A pressure measuring device is provided with an indicator such as a bourdon tube (10) for indicating the absolute value of the difference in pressure between fluids applied to the indicator through first and second conduits (15) and (20). Valve means (25) including an element (100) actuable in response to the pressure in conduits (15) and (20) consistently applies the higher pressure fluid to that portion of the indicator adapted to receive such higher pressure fluid and the lower pressure fluid to that portion of the indicator adapted to receive the lower pressure fluid. Optical means such as transmitter (115) and receiver (120) are provided for indication of the sign (positive or negative) of the pressure difference.

6 Claims, 4 Drawing Figures

PRESSURE MEASURING DEVICE

DESCRIPTION

TECHNICAL FIELD

This invention relates to pressure measuring devices.

BACKGROUND ART

Typical pressure measuring devices measure the difference in pressure between a fluid provided to the device and the ambient or between two discrete fluids. Certain prior art pressure measuring devices employ bourdon tubes, hollow curved tubes pressurized interiorly thereof by one of the fluids and exteriorly thereof by the other fluid or ambient. Pressurization of the interior of the tube tends to straighten it, the movement of the tube end being indicative of the difference in pressure between the fluids. Where it is desirable to employ a bourdon tube to measure the difference in pressure between two discrete fluids, the higher pressure fluid must be provided to the interior of the tube and the lower pressure fluid to the outside thereof. When it is not known which fluid will be of the higher pressure, means are required to distinguish the higher pressure fluid from the lower pressure fluid so that the higher pressure fluid may be applied to the interior of the tube and the lower pressure fluid to the outside thereof. Furthermore, means must be provided to indicate which fluid is of the higher pressure so that the sign of the pressure drop being measured may be determined.

The pressure measuring device of the present invention provides a digital reading of differential pressure magnitude and sign, making the device particularly well suited for use with electronic computers.

DISCLOSURE OF INVENTION

It is therefore a principal object of the present invention to provide a pressure measuring device for measuring the difference in pressure between two fluids and having means for consistently applying the higher pressure fluid to that portion of the device adapted to receive the higher pressure and the lower pressure fluid to that portion of the device adapted to receive the lower pressure.

It is another object of the present invention to provide such a pressure measuring device with means for determining the sign of the pressure difference measured by the device.

In accordance with one aspect of the present invention, the pressure measuring device includes an indicator such as, for example, a bourdon tube, provided with fluid(s) at different pressures through first and second conduits and a valve means which automatically applies the fluid of highest pressure to that portion of the indicator adapted to receive the higher pressure fluid, and the fluid of lower pressure to the corresponding portion of the indicator. The indicator thereby functions to indicate an absolute pressure difference regardless of which conduit transmits the higher pressure fluid and which transmits the lower pressure fluid to the indicator. In accordance with another aspect of the present invention, the pressure measuring device is provided with means for indicating the sign (positive or negative) of the pressure drop i.e., which of the two conduits is supplying the higher pressure fluid and which is supplying the lower pressure fluid.

In the preferred embodiment, the indicator comprises a bourdon gauge and the valve means includes a movable element set by the fluid pressure in the conduits to consistently connect the interior of the bourdon tube with the higher pressure fluid and the exterior of the tube with the lower pressure fluid. The indicator may include any suitable means for providing a reading of the quantitative pressure difference, in the preferred embodiment such means comprising a Gray code plate interposed between an optical transmitter and receiver. Movement of the bourdon tube sets the position of the code plate relative to a transmitter and receiver, that position being indicative of the absolute pressure difference or drop between the fluids in the two conduits. The means for indicating the sign of the pressure difference may be optical in nature and disposed on the valve. In the preferred embodiment such optical means comprises an optical transmitter and receiver and means carried on the valve element for interrupting a signal therebetween. Such an interrupter may comprise a mirror which transmits a signal between the transmitter and receiver when the valve element is in a particular position or a shutter for blocking the signal when the valve element is in that position.

BEST MODE FOR CARRYING OUT THE INVENTION

Figure 1:
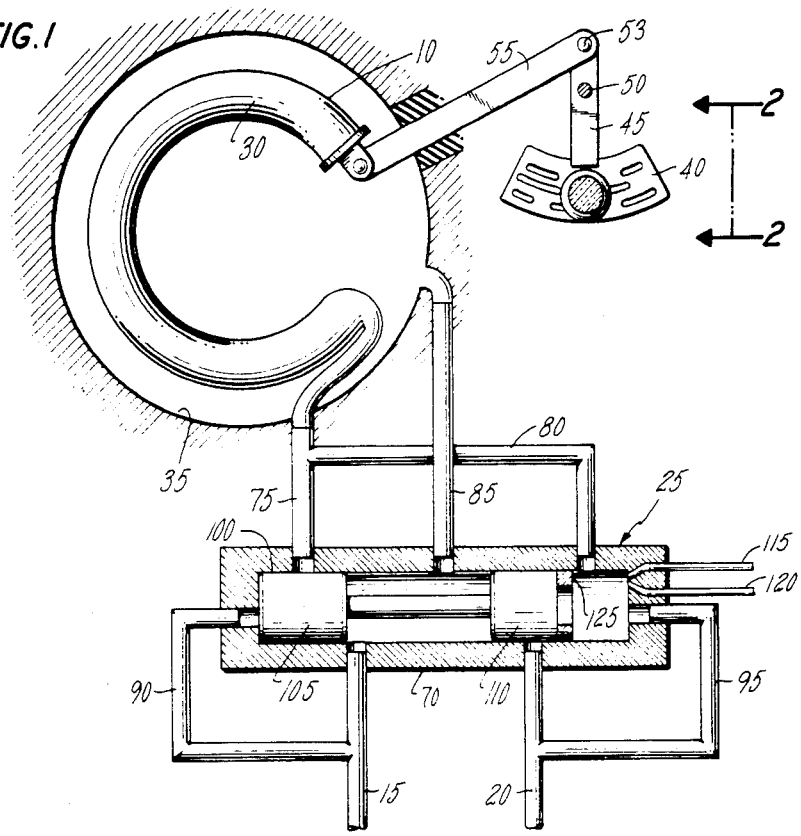
FIG. 1 is a generally schematic representation of the fluid pressure measuring device of the present invention.
Figure 2:
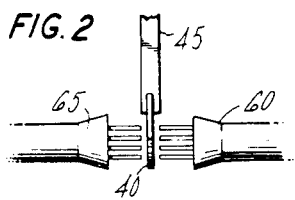
FIG. 2 is an enlarged fragmentary side view taken in the direction of line 2—2 of FIG. 1 of an optical indicator employed with the pressure measuring device of the present invention.

Referring to FIG. 1, the pressure measuring device of the present invention includes an indicator such as a bourdon tube 10 adapted to be pressurized with fluids from first and second conduits 15 and 20 through a valve means 25. Bourdon tube 10 includes a curved inner chamber 30 and an outer chamber 35. Those skilled in the art will recognize that the difference in pressure between fluids admitted to the inner and outer chambers will cause the bourdon tube to straighten to a certain degree, such straightening causing the free end of the tube to move, the amount of such movement being indicative of that pressure difference. Such movement may be indicated by any suitable means, in the preferred embodiment such means comprising a Gray code plate (optical mask) 40 mounted on an arm 45 pivotally mounted at 50 and pivotally connected at 53 to arm 55 which is in turn connected to the end of the bourdon tube. The code plate is interposed between an optical transmitter 60 and optical receiver 65 each comprising for example, a bundle of optical fibers. The location of code plate 40 between the transmitter and receiver passes a particular distribution of light associated with that location from the transmitter to the receiver thereby indicating the amount of straightening and hence the magnitude of the absolute value of the difference in pressure between the fluids in the inner and outer tube chambers.

Those skilled in the art will recognize that for proper operation of bourdon tube 10, the fluid of higher pressure must be applied to inner chamber 30 and the fluid of lower pressure to outer chamber 35. Accordingly, when the pressures of the fluids within passages 15 and 20 vary to such an extent that it is not possible to predict with certainty which passage will accommodate the higher pressure fluid, the pressure measuring device of the present invention must be provided with means disposed between the bourdon tube and passages 15 and 20 to consistently apply the higher pressure fluid to the inner chamber and the lower pressure fluid to the outer chamber. Valve means 25 performs this function.

Referring again to FIG. 1, valve means 25 includes a housing 70 the interior of which communicates at the ends thereof with the inner bourdon tube chamber 30 through passages 75 and 80. The interior of the housing communicates with the outer bourdon tube chamber 35 through passage 85 connected to the valve at a medial portion thereof. Passages 15 and 20 communicate with the ends of the valve housing through passages 90 and 95 and directly to portions of the valve housing intermediate the ends and medial portion of the housing.

Valve means 25 includes a valve element 100 reciprocable therewithin in response to the application of fluid pressure thereto through passages 90 and 95. Valve element 100 includes a pair of spaced lands 105 and 110, it being recognized that various other configurations may suggest themselves to those skilled in the art as determined by the particular arrangement of passages in housing 70.

The operation of the valve means is as follows. Assuming for purposes of illustration that passage 15 accommodates the higher pressure fluid, the application of this fluid to land 105 through passage 90 will urge valve element 100 to the right, overcoming the less forceful application of the lower pressure fluid to land 110 through passage 95. Such movement of the valve element opens a passage through the valve at the left-hand end thereof for application of the higher pressure fluid into bourdon tube chamber 30 from passage 15, through the valve housing and finally through passage 75. It will be seen that if passage 20 accommodates the higher pressure fluid, valve element 100 will be urged to the left, opening a passage through the right-hand end of valve 25 between passage 20 and chamber 30 through passage 80 and the end of passage 75. Thus, it is seen that valve 25 functions to consistently apply the higher pressure fluid from either of passages 15 and 20 to the inner bourdon tube chamber irrespective of which conduits 15 and 20 accommodates the higher pressure fluid and which the lower pressure fluid.

Figure 3:
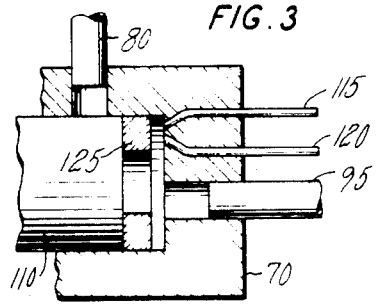
FIG. 3 is an enlarged fragmentary view of a portion of a valve element employed with the pressure measuring device of the present invention as illustrated in FIG. 1.

It is noted that the reading given by the bourdon tube (the optical indicator connected thereto) is an absolute reading. For indication of the sign (positive or negative) of the pressure drop given by the bourdon tube, valve 25 is provided with means for providing an optical signal in response to the higher pressure fluid being provided to the pressure measuring device through one of the conduits 15 and 20. This optical means comprises an optical transmitter and receiver 115 and 120 disposed in the right-hand end of housing 70 and oriented so as to be longitudinally directed at land 110 of valve element 100 when the element is in its right-hand position. Like transmitter and receiver 60 and 65, transmitter and receiver 115 and 120 may comprise one or more optical fibers. Land 110 may, as shown in FIGS. 1 and 3, be provided with a mirror 125 which reflects a light signal emanating from transmitter 115 to receiver 120. This transmission, being fed to a suitable optical signal processor (not shown) indicates that the valve element is in its right-hand most position and therefore that the higher pressure is being provided through passage 15 or, in other words, the sign of the pressure drop noted by the bourdon tube indicator. Movement of valve element 100 to the left will interrupt this signal thereby indicating that the higher pressure fluid is provided through conduit 20, a pressure difference of opposite sign.

Figure 4:
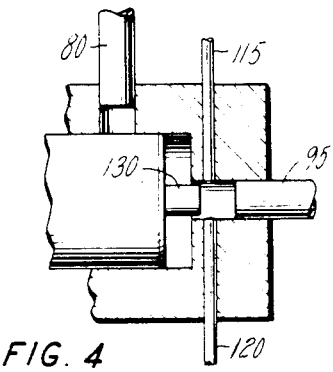
FIG. 4 is an enlarged fragmentary view of an alternate embodiment of means associated with the pressure measuring device indicating the sign of the measured pressure drop.

While the present invention has been described with respect to a particular embodiment thereof, it will be appreciated by those skilled in the art that various alternate embodiments may be employed without departing from the invention. Thus, it is seen that as shown in FIG. 4, rather than mirror 125, valve element 100 may employ a shutter 130 carried by land 110, the shutter interrupting the optical signal between transmitter 115 and receiver 120 as the shutter is received within the termination of passage 95. The interruption of that optical signal indicates the position of valve element 100 and therefore which of conduits 15 and 20 accommodates the higher pressure fluid. Likewise, it will be seen that while bourdon tube 10 has been described as providing an optical signal indicative of absolute pressure drop, without departing from the present invention, the tube may be connected to a dial or other suitable readout for providing a reading of the absolute value of the pressure difference between the fluid(s) in conduits 15 and 20.

Having thus described the invention what is claimed:

1. A device for measuring the difference in pressure between a higher pressure fluid and a lower pressure fluid, said pressure measuring device comprising an indicator including first indicator means adapted to be pressurized with said higher pressure fluid, second indicator means adapted to be pressurized with said lower pressure fluid, said first and second indicator means indicating the absolute value of said pressure difference, said pressure sensor being characterized by:

a first conduit for supplying one of said fluids to said indicator;

a second conduit for supplying the other of said fluids to said indicator; and valve means in fluid communication with said first and second indicator means and with said first and second conduits, said valve means being actuable by said pressure difference between said first and second fluids to consistently place said first indicator means in fluid communication with said higher pressure fluid and said second indicator means in fluid communication with said lower pressure fluid.

2. The pressure measuring device of claim 1 characterized by:

said valve means including a housing communicating at opposed ends thereof with said first indicator means and at a generally medial portion thereof with said second indicator means, said housing at said ends thereof, and at portions thereof intermediate said ends; and said medial portion communicating with said first and second conduits, said valve means including interiorly of said housing a valve element reciprocatable between said housing ends, said higher pressure fluid urging said valve element away from said housing end at which said higher pressure fluid is applied, thereby opening a passage through said valve at said housing end for application of said higher pressure fluid to said first indicator means and simultaneously opening a passage through said valve at said medial portion for application of said lower pressure fluid to said second indicator means.

3. The pressure sensor of claim 1 characterized by said valve means including thereon, means for determining through which of said first and second conduits the higher pressure fluid is applied to said valve means.

4. The pressure measuring device of claim 3 characterized by said valve means including a housing and a valve element movable therewithin, said determining means including means for providing an optical signal to said valve element, means for receiving said optical signal and means carried by said valve element for selectively interrupting the transmission of said optical signal in response to said higher pressure fluid being provided to said valve means through a select one of said first and second conduits.

5. The pressure sensor of claim 4 wherein said interrupting means comprises a shutter carried by valve element.

6. The pressure sensor of claim 4 wherein said interrupting means comprises a mirror carried on said valve element, transmission of said optical signal from said optical signal providing means to said receiving means being by way of reflection of said signal from the surface of said mirror.

* * * * *